June 2, 1942.  S. P. LOVELL  2,285,376
PROCESS OF MAKING FORMS
Filed May 20, 1940
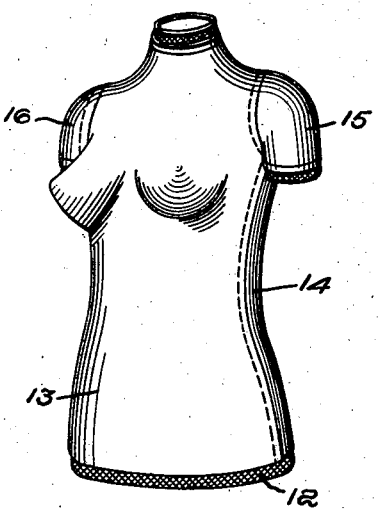
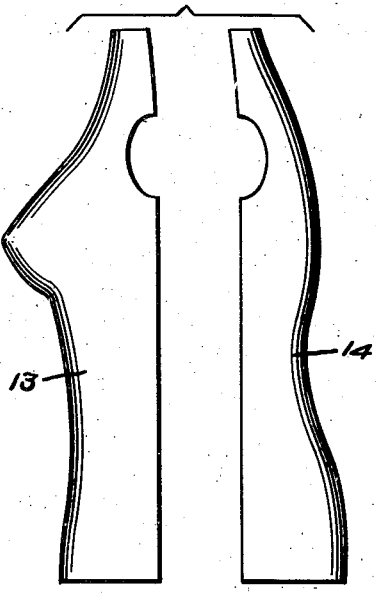
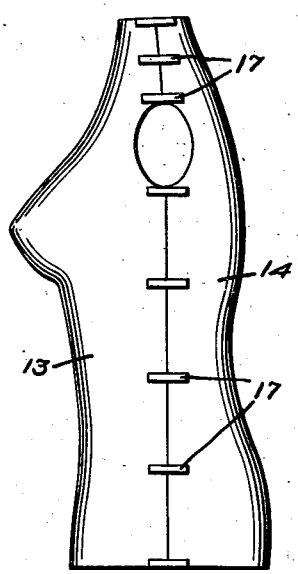
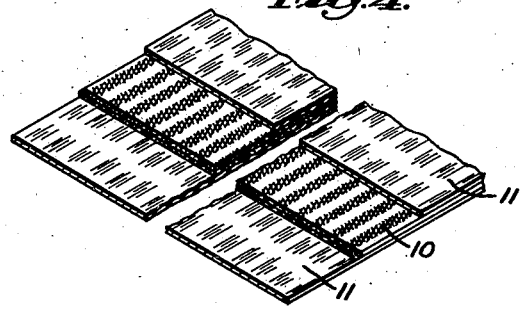

Patented June 2, 1942

2,285,376

UNITED STATES PATENT OFFICE 2,285,376

PROCESS OF MAKING FORMS

Stanley P. Lovell, Newton Center, Mass., assignor to Beckwith Manufacturing Company, Dover, N. H., a corporation of New Hampshire Application May 20, 1940, Serial No. 336,187

16 Claims. (Cl. 223—68)

This invention consists in a novel process of making dress forms, tailor's dummies for window display, protectors for athletes, and the like, from living or other models and includes within its scope a novel thermoplastic sheet or strip material by the use of which the process may be advantageously put into practice. Attempts have been made heretofore to employ plaster of Paris, wet papier-mâché, glued paper tape and other materials for this purpose, but none of these materials is entirely satisfactory in that they become distorted when exposed to humid conditions or they are fragile and easily damaged, or when made from living models, they impose a heavy burden on the person being fitted. For example, plaster of Paris is easily cracked or chipped; papier-mâché and gummed tape are distorted by moisture, and the discomfort to a living model encased in these moisture-containing materials is extreme and even a serious danger to health.

The object of the present invention is to make available a process obviating the difficulties above discussed and providing a light, tough, resilient form accurately shaped to the model and, if desired, produced without discomfort from a living model.

I have discovered that these results may be achieved by employing in the construction of the form a thermoplastic sheet material capable of being readily conformed to any desired shape when rendered plastic by means of moderate heat, and having the capacity of hardening and stiffening to retain the desired molded form upon being cooled to room temperature.

The essential qualities of the material employed in carrying out my invention are that it should be available in sheet or strip form capable of being rendered limp or plastic by moderate heat, that it should remain in that condition for an appreciable interval and throughout an appreciable range of temperature so that it may be molded closely to the body of a living model without discomfort, that it should then stiffen in its molded form by cooling to room temperature, and finally that in its stiffened form it should be light, tough and resilient and not subject to distortion if moistened.

I have further discovered that a satisfactory material may be provided by blending and plasticizing vegetable wax, rubber, beeswax, and resin and then spreading or distributing the material in sheet form with a fabric base or backing.

An important feature of my invention consists in compounding this material so that it has the property of becoming softened or plastic within a narrow range of critical temperature, while it stiffens slowly and only by cooling through a considerable range of temperature below its softening point. For example, it may soften between temperatures of 125° F. to 140° F. and harden between 80° F. and 100° F.

For my fibrous base I may employ a cotton woven cloth such as flannel or a felted cloth but I prefer to employ a knitted material. I have found desirable for this purpose tubular knit goods of a count of 34/36 K. P., weighing approximately eight yards to the pound. Such a knitted base has great stretch from edge to edge, but little stretch lengthwise of the goods. It may be immersed in the molten bath described hereinafter and thereupon acquires a load of the saturant and upon removal and cooling forms a solid flexible sheet of substantially uniform thickness. When cooled the resulting sheet is very tough as a whole although its coating is locally brittle so that the sheet crackles slightly upon being worked between the fingers. Its surface is fairly smooth although it may show traces of the enclosed textile structure. For example, if a knitted fabric base is used the surface of the composite sheet will have therein a detectable indication of the longitudinal ribs of the base.

An important and novel feature of my invention consists in the employment of a double or multiple ply knitted fabric as a base for the thermoplastic sheet of my invention, and as a base for the resulting dress form. I prefer to utilize a tubular knitted fabric which may be doubled and flattened without cutting and so present no raw edges. The double ply material has many advantages. In the first place, it is highly elastic and tends to preserve its sheet form at all times. As a result of this characteristic the fabric may be drawn when applying the impregnating compound, or tensioned later in use without constricting objectionably or pulling into stringy form. Moreover, it has no tendency to unravel, it stretches and contracts without wrinkling in the necessary areas in being conformed to the human figure, and under all conditions carries its impregnating compound smoothly. Further, when the two plies are united in the finished dress form they strengthen the form with a plywood effect.

In treating the multiple ply fabric base the impregnating compound is deposited throughout the plies themselves, between the plies and as a surface coating upon the plies. The intermediate cementitious layer is effective to recement the two plies together when the sheet material hardens on the model.

The sheet above described is thermoplastic in its response to heat. It may be softened and rendered temporarily limp, adhesive or tacky and plastic by being moderately heated, as in a steam plate to a temperature of 125° F. to 140° F. In this condition it may be conformed accurately to the contour of the model and this operation is facilitated by the fact that in cooling the sheet remains plastic throughout an appreciable range of temperature before stiffening at a temperature below that at which it had been softened. To express it differently:—The sheet does not become stiff when cooled to the point at which it initially became pliable on the steam plate, but remains soft and pliable in cooling down to and substantially below that point, thus affording opportunity for the conforming operation to be carried out or continued until the stiffening takes place at substantially lower temperature. When cooled to room temperature, however, the sheet hardens and stiffens in its conformed condition upon the model into an integral shell which is stiff, resilient and impervious to moisture. It will be noted also that the hardening or stiffening step of my improved process is affected by temperature change alone and that in this step no solvent vapor which may be inflammable or possibly toxic to a living model is evolved from the plastic material.

My preferred formula includes

| | Parts |
|---|---|
| Candelilla wax | 30 |
| Rubber | 10 |
| Beeswax | 10 |
| Resin or rosin | 50 |

Candelilla wax is well-known natural vegetable wax and is obtainable in various commercial forms with melting points of 150° F. to 180° F. The resin employed may be one of a class consisting of thermoplastic as distinguished from thermosetting resins, among which I enumerate polysterene, polyvinylacetate, butyl, methacrylate, and for purposes of economy these or any one of them may be blended with resin.

In making up the foregoing formula the preferred procedure is to mill the rubber upon heated rolls with the candelilla wax, adding to the mass in the mill, if desired, any suitable pigmentation, such as zinc or titanium oxides, iron oxide, or the like. The beeswax is meanwhile reduced to molten condition and the resin or resin-rosin compound added thereto. The rubber-candelilla mixture mixture is then dissolved in the molten beeswax-resin solution at the molten temperature, that is to say, in the neighborhood of 320° F. and the whole mixture stirred until it becomes apparently a homogeneous blend.

Another valuable characteristic of the impregnating or indurating compound is that the resulting dress form is pinable to a remarkable degree, that is to say the material is somewhat clinging or self-healing so that dress parts may be pinned to the form again and again in substantially the same place without breaking away the form so that it will not retain the pin.

If it is desired to produce a dress form, the skin of the model may be protected by an insulating vest which thus becomes a part of the model, and for that purpose wool or jersey has been found very satisfactory. The thermoplastic sheet may now be cut into patterns of suitable shape, warmed on a steam table or on a hot dry plate and applied to the body of the model. The pattern may be substantially that of a poncho, that is to say, a sheet with a head hole in it and two side portions which may be brought down front and back. Alternatively the warmed plastic sheet may be applied as a front and back segment. In any case complete and accurate conformation of the contour of the model is readily brought about, especially since the knitted base will stretch and contract in the areas in which this is necessary, and the plastic form will thus reproduce accurately the reverse curves of the waist and hips.

It is desirable that the impregnating or indurating compound be self-cementing or adhesive when heated and the formula above disclosed results in a material which does fuse or unite to itself when warmed. Accordingly, in applying the plastic sheet material to the model, the edges may be overlapped and will become united without further treatment. After the torso of the model has been encased the conformed sheets will harden collectively into a shell within five or ten minutes in cooling to room temperature. When this is accomplished the shell may be divided into sections by cutting with shears and the sections removed from the model. These sections may be subsequently re-fastened along the lines of severance by any suitable means such as a zipper fastener or adhesive tape. The resulting form which is a faithful replica of the model, enlarged by the thickness of the sheet material, may now be mounted upon an upright stand and is ready for use.

The accompanying drawing is illustrative of one manner in which the process of my invention may be put into practice, and in this:

Fig. 1 is a view in perspective showing the plastic sheet material as applied to the torso of a model, Fig. 2 is a view in elevation showing the hardened shell split and removed from the model, Fig. 3 is a view in elevation showing the complete form, and Fig. 4 is a view in perspective with portions broken away showing the structure of the plastic sheet material.

Referring first to Fig. 4, the knitted fabric backing 10 is represented as a tubular body flattened so that it presents two contiguous plies with its outer margins formed by the fold of the material. When this material is drawn through a bath of the hot plastic compound it becomes thoroughly impregnated with it and acquires a surface coating on both outer faces as well as sufficient material between the two plies to cement the latter together. The surface coating 11 is indicated in Fig. 4 with somewhat exaggerated thickness for illustrative purposes. In practice the coating is continuous but not so thick as to obscure completely the ribbed structure of the knitted fabric.

As suggested in Fig. 1 the sheet material may be cut into two elongated panel sections with the ribs of the fabric running crosswise so that the maximum stretch of the fabric is lengthwise of the model. The panels are rendered plastic and tacky by being heated on a steam table to perhaps 140° F. In this condition they are applied one by one to the torso of the model which has previously been protected with a close fitting garment or vest 12 of wool or jersey. The heated panel sections become soft and plastic and may be conformed quickly and accurately to the contour of the model. In this operation the sheet material acts very much as does its uncoated fabric base in that it readily stretches in conforming to convex curves and readily contracts in conforming to concave curves, under all circumstances maintaining a continuous coating of substantially uniform thickness.

As suggested in Fig. 1 the back panel section 14 is put in place first and then the front panel section 13 is conformed to the model with its longitudinal edges overlapping the edges of section 14. In the conforming operation the panels may be trimmed to provide armholes and folded or trimmed about the shoulders and throat. The panel sections adhere to the undergarment 12 and their overlapping edges become fused or welded together. When the panel sections are rendered plastic the bond between the two plies of the fabric base is more or less relaxed and in the conforming operation the two plies may slip to make relative adjustment in the form as a whole.

The conformed panel sections are now allowed to harden collectively upon the model. As already noted this will take place in not over five or ten minutes as the shell is permitted to cool to room temperature. The sections harden in this cooling operation and the two plies of the fabric base recement themselves in their conformed relation. As a result of the hardening operation the model is encased or partially encased in a light hard resilient shell of exactly the desired shape. This shell may now be removed from the model by slitting along any desired lines, as for example, by slitting into two halves by lines located diametrically upon opposite sides of the model. In this operation it is usually convenient to slit the underlying garment 12 and remove it with the hardened sections. The portions of the garment may then be stripped from the concave surfaces of the shell sections and the sections are now ready to be reunited.

This may be effected by fusing or welding the severed edges of the sections by heat or by providing them with zipper fastener strips or by tacking them with strips 17 of the sheet material rendered adhesive by heat. The completed form is now ready for any desired finishing operation and may then be finally mounted at the proper height upon a suitable stand.

The present application is a continuation as to all common subject matter of my copending application, Serial No. 304,209, filed November 13, 1939, in which I have disclosed and claimed an improved thermoplastic sheet material.

Having thus disclosed my invention and described specific examples of its application, I claim as new and desire to secure by Letters Patent:

1. The process of making a dress form or the like from a human model provided with a protective garment, consisting in applying to said garment and molding to the contours of the torso of the model a plurality of torso-encasing panel sections of thermoplastic sheet-material in limp conformable condition and causing said sections to adhere to said garment, said sections of sheet-material comprising an elastic textile base impregnated with a thermoplastic composition being conformably plastic at a temperature of about 140° F., dividing the molded and hardened shell thus formed and removing said shell from the model, and then uniting the divided portions of said shell.

2. The process of making a dress form or the like from a human model provided with a protective garment, consisting in encasing the torso of a model in a hardened shell by adhesively applying to said garment and molding to the contours of the model a plurality of panel sections of thermoplastic sheet material in limp conformable and tacky condition, said sections of sheet-material comprising an elastic textile base impregnated with a thermoplastic composition having the characteristic of softening and becoming plastic in a narrow range of critical temperature and of stiffening throughout a relatively wide range of temperature, dividing the molded and hardened shell and removing said shell from the model, and then uniting the divided portions of said shell.

3. The process of making a dress form or the like from a human model provided with a close-fitting garment, consisting in conforming to the torso of a model temporarily softened thermoplastic and tacky panel sections which include a double ply base of textile fabric impregnated and coated on both sides with a thermoplastic compound, permitting the conformed panels to harden on the model and causing them to adhere thereto, and subsequently uniting them into an integral shell.

4. The process of making a dress form or the like from a human model provided with a close-fitting garment, consisting in conforming to the torso of a model temporarily softened and tacky thermoplastic panel sections which include a double ply of knitted fabric impregnated and coated on both sides with a thermoplastic compound and which are applied with the maximum stretch of the fabric heightwise of the model, hardening the conformed panels at room temperature in adherent contact with the said garment, and subsequently uniting them in an integral shell.

5. In the process of making dress forms from a living model provided with a protective vest, the steps which consist in applying to said vest and molding to the contours of the model a plurality of sections of stretchable thermoplastic sheet material in heated and conformable plastic condition and with their margins overlapping each other, and then allowing the sections to cool and collectively harden in conformed shape upon the model.

6. In the process of making dress forms from a living model provided with a protective vest, the steps which consist in adhesively applying to said vest and molding to the contours of the model a plurality of sections of stretchable thermoplastic sheet material in heated and conformable plastic condition and with their margins overlapping each other, and then allowing the sections to cool and collectively harden in conformed shape upon the model and while adhering to the said vest.

7. In the process of making dress forms from a living model provided with a protective vest, the steps which consist in applying to said vest and molding to the contours of the model a plurality of sections of stretchable thermoplastic material in heated conformable plastic condition and with their margins overlapping each other, adhesively uniting the margins of the sections into a continuous shell upon the model, cooling and hardening the shell, opening and removing the hardened shell, and then uniting the opened shell in an integral form.

8. In the process of making dress forms from a living model provided with a protective vest, the steps which consist in applying a molten composition of vegetable wax, rubber, beeswax and resin to a textile base and hardening the same into a flexible non-tacky sheet, then heating separate sections of the sheet to render them plastic and adhesive, conforming the said sections in this condition to the contours of a model with the margins of the sections overlapping each other and so that they are temporarily retained in place, cooling and hardening the conformed and overlapping sections in a shell upon the model, and then opening and removing the hardened shell.

9. The process of making dress forms or the like from human models, which consists in heating and softening thermoplastic sheet material which has the property of being rendered tacky and soft by heat and of remaining in softened condition until cooled substantially below its initial softening point temperature, conforming the softened sheet material to the contour of the model while it is cooling through a range of temperature below its said softening point, adhesively uniting the edges of the sheet material into a continuous shell upon the model, cooling and hardening the shell, opening and removing the hardened shell, and reuniting the shell in integral form.

10. The process of making molded forms which consists in applying to a textile base a molten composition of vegetable wax, rubber, beeswax and resin having the property of being rendered tacky and soft by heat and of remaining soft until cooled substantially below its initial softening point temperature, hardening the textile base with its applied composition into a flexible, non-tacky sheet, then heating pieces of the sheet to render them flexible and adhesive, conforming the said pieces in this condition to a model and continuing the conforming operation while the composition is cooling below its softening point, cooling and hardening the conformed shell upon the model, and then opening and removing the hardened shell.

11. The process of making molded forms which includes the steps of applying to a double-ply textile base a molten composition of vegetable wax, rubber, beeswax and resin which has the property of being rendered soft by heat, and of remaining soft until cooled substantially below its softening point temperature, then heating pieces of the sheet to render them plastic and adhesive, conforming separate pieces in softened condition to a model and continuing the conforming operation through a range of temperature below the softening point of the composition while the two plies of the textile base are free to slip and make relative adjustment in the form as a whole, cooling and hardening the conformed and adherent pieces in a shell upon the model and then removing the hardened shell.

12. A dress form comprising a plurality of thermoplastic sections marginally united into a self-sustaining shell, said sections having a stretchable fabric base impregnated and coated with a composition of approximately 30 parts candelilla wax, 10 parts rubber, 10 parts beeswax and 50 parts resin, and forming a shell which is stiff and resilient at room temperature.

13. In the process of making dress forms from a living model provided with a protective vest, the steps which consist in adhesively applying to and assembling upon said vest and molding to the contours of the model a plurality of sections of stretchable thermoplastic sheet material in heated and conformable plastic condition, and allowing the plurality of sections to cool and harden collectively in conformed shape upon the model.

14. In the process of making dress forms from a living model provided with a protective vest, the steps which consist in assembling upon said vest and molding to the contours of the model a plurality of sections of stretchable thermoplastic sheet material in heated and conformable plastic condition, and so making substantially complete circumferential encasement of the torso of the model, and allowing the plurality of sections to cool and harden collectively in conformed shape upon the model.

15. The process of making dress forms which is characterized by the steps of providing panels of thermoplastic sheet material having a knitted fabric base more stretchable in one direction than the other, heating the panels to render them pliable, applying the heated panels to a model with maximum stretch of the fabric base effective longitudinally of the body of the model, stiffening the panels upon the model by cooling, separating and removing the conformed panels from the model, and subsequently uniting them in an integral shell.

16. In the process of making dress forms from a model provided with a protective vest, the steps which consist in adhesively applying to and assembling upon said vest and molding to the contours of the model a plurality of sections of stretchable thermoplastic sheet material in heated and conformable plastic condition, allowing the plurality of sections to cool and harden collectively in conformed shape upon the model to form a hardened shell, dividing and removing the shell and the vest from the model, removing the vest from the shell, and reuniting the divided portions of said shell apart from the vest.

STANLEY P. LOVELL.

CERTIFICATE OF CORRECTION.

Patent No. 2,285,376.   June 2, 1942.

STANLEY P. LOVELL.

It is hereby certified that error appears in the printed specification of the above numbered patent requiring correction as follows: Page 1, second column, line 6, for "80° F." read --125° F.--; page 3, first column, line 69, claim 1, after the word "conformable" insert --and tacky--; and that the said Letters Patent should be read with this correction therein that the same may conform to the record of the case in the Patent Office.

Signed and sealed this 21st day of July, A. D. 1942.

(Seal)

Henry Van Arsdale,
Acting Commissioner of Patents.